(12) United States Patent
Bolander et al.

(10) Patent No.: US 6,874,463 B1
(45) Date of Patent: Apr. 5, 2005

(54) ENGINE AND METHOD OF OPERATION WITH CYLINDER DEACTIVATION

(75) Inventors: Thomas E. Bolander, Flint, MI (US); Jeffrey J. Allen, Kelkheim-Fischbach (DE); Alexander J. Roberts, Rochester, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/787,419

(22) Filed: Feb. 26, 2004

(51) Int. Cl.$^7$ ................................................ F02B 77/00
(52) U.S. Cl. ................................... 123/198 F; 123/481
(58) Field of Search ............................. 123/198 F, 481

(56) References Cited

U.S. PATENT DOCUMENTS

| | | | |
|---|---|---|---|
| 3,765,394 A | * 10/1973 | Francis ................... | 123/198 F |
| 4,296,719 A | * 10/1981 | Takahashi et al. ....... | 123/198 F |
| 6,647,947 B2 | * 11/2003 | Boyer et al. ............. | 123/198 F |
| 6,687,602 B2 | * 2/2004 | Ament ....................... | 701/110 |
| 6,715,289 B2 | * 4/2004 | Mader et al. .................. | 60/612 |

* cited by examiner

Primary Examiner—John T. Kwon
(74) Attorney, Agent, or Firm—Karl F. Barr, Jr.

(57) ABSTRACT

An engine with cylinder deactivation (Displacement on Demand or DOD™) includes standard (STD) cylinders which are not deactivated and DOD cylinders which can be deactivated by closing their intake and exhaust valves and shutting off their fuel supply. To provide smooth transitions, the STD and DOD cylinders form separate groups each supplied with charge air through one or more separate throttles. When switching to DOD operation, the throttles are oppositely actuated to cut out the DOD cylinders and maintain torque in the active cylinders prior to deactivation of the cylinder valves. When returning to STD operation, the valves are reactivated before oppositely actuating the throttles to enable full cylinder operation. In DOD operation, a small supercharger may be operated to boost torque of the operating STD cylinders and thus increase the DOD operating range.

9 Claims, 3 Drawing Sheets

ENGINE AND METHOD OF OPERATION WITH CYLINDER DEACTIVATION

TECHNICAL FIELD

This invention relates to automotive engines with cylinder deactivation and to improved means and methods for operation of such engines.

BACKGROUND OF THE INVENTION

Cylinder deactivation (also called Displacement on Demand or DOD™), generally involves deactivating the intake and exhaust valves of up to half of the cylinders of a vehicle engine. Simultaneously, fuel flow to those cylinders is cut off, at the same time increasing air and fuel supplied to the remaining engine cylinders, which continue to operate and provide power for driving the vehicle. During the changeover, a torque bump or sag may be noticeable to the vehicle operator under at least certain conditions of operation of the engine.

In the development of automotive engines, DOD is of current interest for providing engine operation with higher efficiency during highway cruising and at lower speeds and loads. However, it is desired to provide smooth transitions between standard (STD) full cylinder operation and DOD (cylinder deactivation) operation, which will make the changeover essentially unnoticeable to the vehicle operator. In addition, it is desired to provide an increase in engine torque output during cylinder deactivation operation on less then all the engine cylinders in order to permit continued DOD operation when the vehicle operator calls for a moderate torque increase, or operation at a higher speed within the capabilities of the engine.

SUMMARY OF THE INVENTION

The present invention provides improved means and operating methods for use in obtaining improvements in DOD operation. To avoid a noticeable change in engine torque during changeover to and from DOD operation, the present invention divides the engine cylinders into two or more groups, one including DOD cylinders to be deactivated when efficient running at partial engine power is desired and another including STD cylinders to remain activated and powering the engine when the DOD cylinders of the first group are deactivated.

The separate groups of cylinders are provided with separate manifold passages or ports so that one or more separate throttles may be provided for controlling the operation of each cylinder group. A control is provided for selectively actuating the throttles to smoothly control the changeover of airflow before cylinder valve deactivation and after cylinder valve reactivation. During the changeover processes, the throttles are controlled to concurrently and progressively close the throttles of one group while opening further the throttles of the other group in order to maintain constant torque output during the full changeover in either direction. Deactivation of the engine valves of the deactivated DOD cylinders thus occurs after the throttle adjustments have been made, and reactivation of the engine valves occurs before readjustment of the throttles to provide full engine cylinder activation.

In a further feature of the invention, the engine is provided with a small boost compressor or supercharger that is connected for use during cylinder deactivation on only the STD cylinders that remain in operation. The supercharger is preferably operated only when the operating cylinders are running near their maximum load or torque condition so that the boost, or increased cylinder pressure, provided by the supercharger produces extra power in the operating cylinders. This provides additional performance from the engine while in DOD operation without requiring switchover to operation of all the engine cylinders. This will provide increased efficiency with savings in fuel cost by extending the range of engine operation during cylinder deactivation. In addition, the transitions between full cylinder operation and cylinder deactivation in both directions will be smooth with throttle coordination control and boost coordination control.

These and other features and advantages of the invention will be more fully understood from the following description of certain specific embodiments of the invention taken together with the accompanying drawings.

DESCRIPTION OF THE PREFERRED EMBODIMENT

Figure 1:
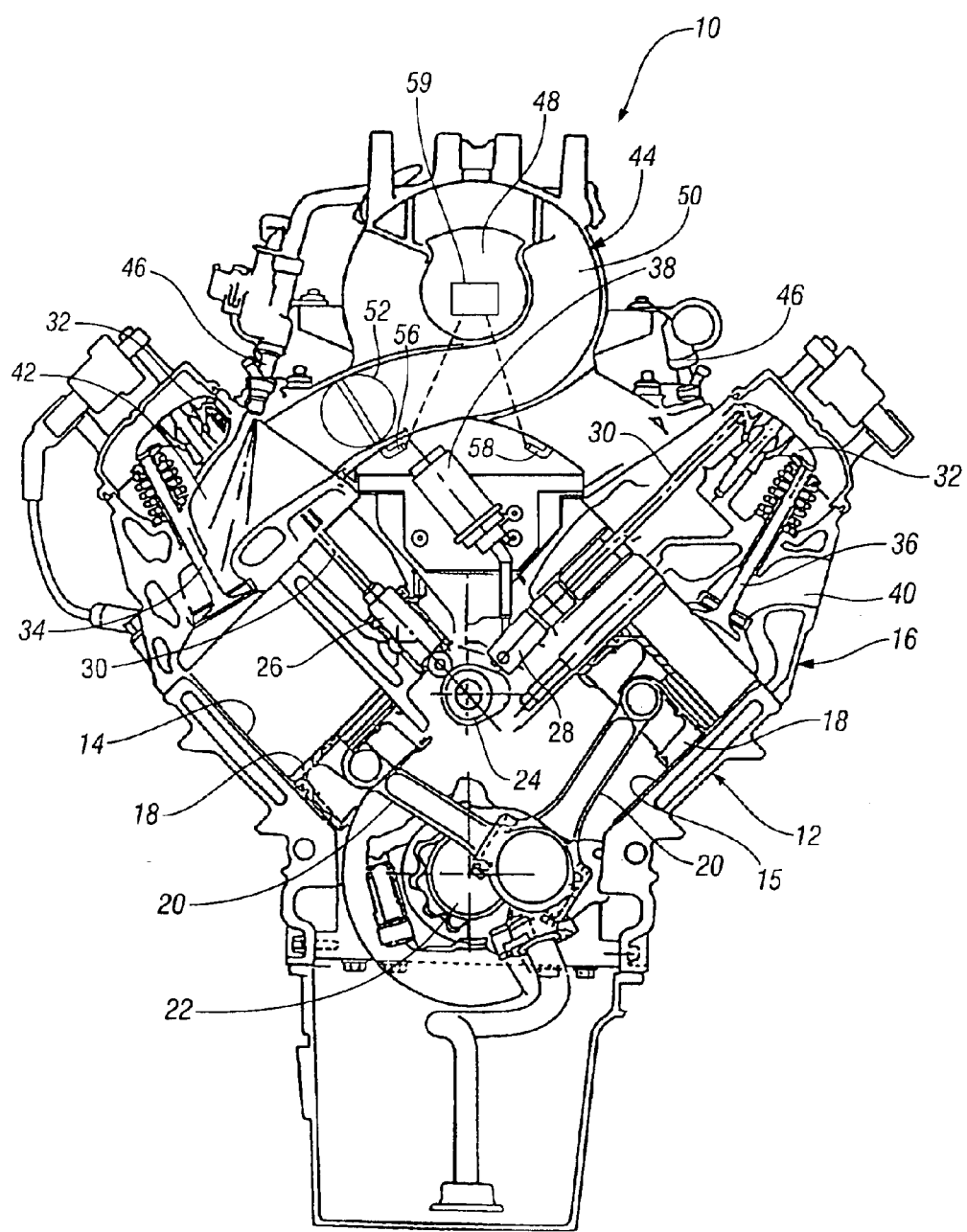
FIG. 1 is a transverse cross-sectional view of an engine including features in accordance with the invention.

Referring first to FIG. 1 of the drawings, numeral 10 generally indicates a V8 automotive internal combustion engine equipped for operation on cylinder deactivation, also called Displacement on Demand or DOD™, the engine further including features according to the present invention. Engine 10 conventionally includes a cylinder block 12 including two banks of cylinders 14, 15 closed at their outer ends by cylinder heads 16. Pistons 18, reciprocating in the cylinders, act through connecting rods 20 to rotate a crankshaft 22, conventionally supported in the cylinder block.

A centrally-mounted camshaft 24 actuates both conventional valve lifters 26 and so called switching valve lifters 28. These act through push rods 30 and rocker arms 32 to actuate intake and exhaust valves 34, 36 carried in the engine cylinder heads 16. The conventional hydraulic lifters 26 actuate intake and exhaust valves 34, 36 of the standard (STD) cylinders 14. The switching lifters 28 are hydraulically actuated, in known manner through electrically controlled solenoid valves 38, to operate the intake and exhaust valves of the deactivation or DOD cylinders 15 to either operate normally in STD engine operation or to deactivate the valves, which remain closed in DOD operation.

The cylinder heads 16 further include exhaust ports 40 which connect with exhaust manifolds, not shown, to carry away exhaust products from the cylinders 14, 15. Cylinder head intake ports 42 deliver intake air from an intake manifold 44 to the engine cylinders 14, 15 upon opening of the intake valves 34. Fuel injectors 46 also supply fuel to the intake ports for admission to the cylinders.

Figure 2:
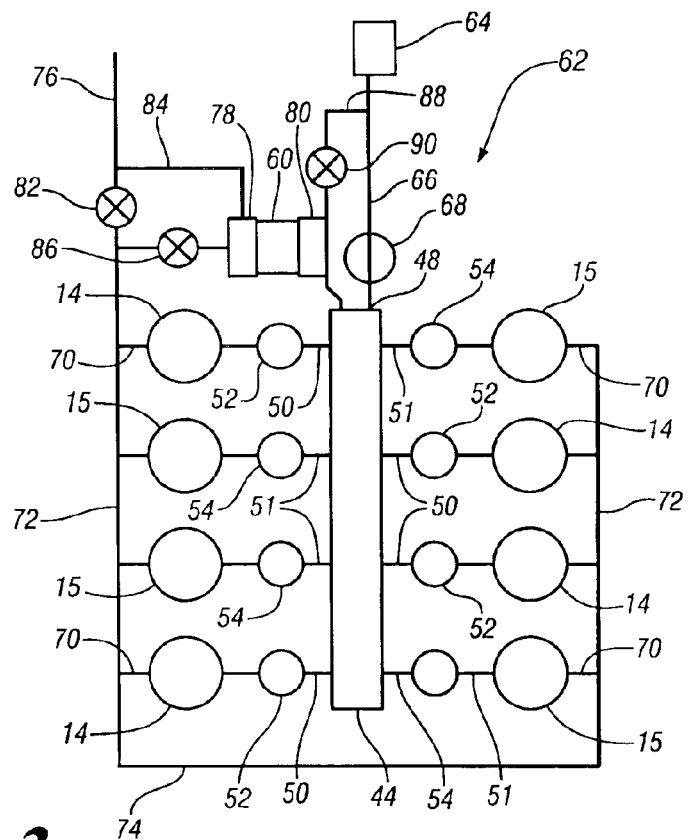
FIG. 2 is a schematic view of the engine air system including individual cylinder throttles and a supercharger for supplemental boost during cylinder deactivation.

Referring also to FIG. 2, the intake manifold 44 includes an intake opening 48 into a plenum which feeds individual STD and DOD intake runners 50, 51 that connect with the cylinder head intake ports 42. In accordance with the invention, the intake runners 50, 51 are controlled by individual throttles 52, 54 (FIG. 2). The throttles are arranged in separate groups for controlling air flow respectively to the DOD cylinders 15, which may be deactivated, and the conventional cylinders 14, which remain always activated during engine operation. The throttles 52, 54 may be actuated in any suitable manner such as, for example, by lever arms 56, 58 (FIG. 1) which may be connected with separate linkages, not shown, for operation by a control 59 in a manner to be subsequently described.

In accordance with the invention, engine 10 may be additionally provided with a supplemental supercharger 60 shown in FIG. 2. Supercharger 60 is selectively operable during DOD operation to pressurize air to the STD cylinders 14 in a manner to be subsequently described.

Referring particularly to FIG. 2 of the drawings, there is shown one possible embodiment of an air system 62 for use with the engine of FIG. 1 and in which like numerals indicate components corresponding to those of the embodiment of FIG. 1.

Intake air system 62 includes an air filter 64, intake conduit 66, intake throttle 68 and the intake manifold 44 into which intake air is inducted or delivered. For air delivery from the intake manifold 44, the cylinders are divided into first and second cylinder groups. The first cylinder group includes STD or non-deactivating cylinders 14 which receive air from the manifold 44 through intake runners 50 and individual throttles 52. The second cylinder group includes deactivating or DOD cylinders 15 which receive air from the manifold through intake runners 51 and throttles 54.

The air system 62 further includes exhaust ports 70, which connect with common exhaust manifolds 72 cross-connected at their ends by a crossover pipe 74. Thus, the exhaust gas from all the cylinders passes through the exhaust manifold system and out through an exhaust pipe 76.

In accordance with the invention, the air system 62 optionally additionally includes a supercharger 60. The supercharger may be of any suitable type and may be driven in any desired fashion, such as electrically, mechanically, or hydraulically. FIG. 2 illustrates, as an example, an exhaust driven turbocharger 60. As is known in the art, the turbocharger 60 includes an exhaust turbine 78 and a centrifugal compressor 80 connected by a common shaft, not shown.

To operate the turbocharger 60, the exhaust manifold outlet is provided with an exhaust shutoff valve 82. A bypass passage 84 extends around the shutoff valve 82 and includes a bypass shutoff valve 86. The bypass passage 84 connects with the exhaust turbine 78 of the turbocharger to direct exhaust gases through the turbine for driving the compressor 80. Similarly, the air intake conduit 66 includes the air intake throttle 68 and a bypass conduit 88 which extends around the intake throttle 68. Conduit 88 connects with the compressor 80 to deliver air through the compressor from the air filter 64 directly to the intake manifold 44 downstream of the intake throttle 68. A bypass valve or throttle 90 in the bypass conduit 88 controls the delivery of air to the turbocharger compressor 80.

Following is an example of the operation of the engine embodiment of FIG. 1 incorporating the air system 62 shown in FIG. 2. In this example, it is assumed that the engine has been started and is running on the full complement of eight cylinders, including both the first (STD) and second (DOD) cylinder groups containing cylinders 14 and 15, respectively. However, it should be understood that it may be practical to start and initially operate the engine with the cylinders 15 of the second cylinder group deactivated.

With the engine operating conventionally on all cylinders, the bypass valves 86 and 90 will be closed and the exhaust shutoff valve 82 and inlet throttle 68 will be fully open, allowing engine operation without operation of the supercharger 60. In this conventional operating mode, the individual intake throttles 52 and 54 of the first and second cylinder groups respectively will be operated together to provide the desired amount of air flow equally to all the engine cylinders 14, 15, fuel being injected in the conventional manner into the intake ports 42 for burning in the engine cylinders to provide power.

When conditions exist in which it is desired to switch to the cylinder deactivation or DOD mode, the throttles 52, 54 will be adjusted concurrently and progressively at a controlled rate by closing the throttles 54 of the second (DOD) cylinder group and correspondingly increasing the openings of the throttles 52 of the first (STD) cylinder group, which is not to be deactivated. As the throttles 52 of the first group are opened farther, the throttles 54 of the second DOD group of cylinders are closed until the engine is operating entirely on the cylinders of the first STD group. During this changeover, engine torque continues to be controlled to the vehicle operator's request as determined by the position of the accelerator pedal.

After the throttles 54 of the second group are closed, the switching lifters 28 are actuated to deactivate the valves of the cylinders 15 of the second DOD group. Because actuation of the throttles is coordinated to provide a constant torque, the changeover to cylinder deactivation is smooth and unnoticeable to the vehicle operator while actual deactivation of the engine valves occurs only after the throttles of the deactivated cylinders are closed.

While the cylinders 15 of the second group remain deactivated, the engine torque requirement may be increased near to a value that would cause a switch back to full engine operation in a standard operating mode. To defer the switch, the engine supercharger may be operated to increase cylinder pressure in the STD cylinders 14. This will allow an increase in engine power sufficient to allow continued operation at a slightly higher level without requiring switchover to the standard operating mode.

Operation of the supercharger 60 is determined by the type of unit being used. In the illustrated embodiment, the turbocharger 60 is operated by opening the bypass valves 86 and 90 and closing the exhaust shutoff valve 82 and the intake throttle 68. Exhaust gas is then directed through the bypass conduit 84 and turbine 78 to drive the turbocharger while intake air is directed through the bypass conduit 88 and the compressor 80, which increases the air pressure delivered to the intake manifold 44. The pressurized intake air in the manifold is delivered only to the operating STD cylinders 14 of the first group, since the cylinders 15 of the second group have been deactivated so that no air is delivered to these cylinders. When the requirement for extra engine torque is no longer needed, the turbocharger is deactivated by returning the control valves 80, 86, 68, 90 to their original positions and the engine operates normally in the DOD deactivation mode.

When the vehicle operator actuates the accelerator pedal to call for additional engine torque and a return to full cylinder STD operation is required, the switching valve lifters 28 of the deactivated cylinders will first be operated to again activate the valves in the second group of cylinders 15. Then the throttles 52, 54 of the first and second cylinder groups will be actuated concurrently and progressively at a predetermined rate to return to their original positions. This requires that the throttles 54 of the second cylinder group be opened while the throttles 52 of the first cylinder group are correspondingly partially closed until both sets of throttles are positioned properly to provide equal air charges to all the operating cylinders of the engine. With this mode of changeover from DOD cylinder deactivation operation to STD all cylinder operation, the torque is again controlled during adjustment of the cylinder throttles so that there is no discontinuity or bump in the engine torque curve and the change in operation is unnoticeable to the vehicle operator.

While the embodiment of FIGS. 1 and 2 contemplates the use of individual cylinder throttles in the manifold runners or intake ports of each of the cylinders, it should be understood that alternative arrangements of cylinder throttling may equally well be utilized. For example, suitable manifolding may be provided so that a single throttle is utilized for each of the two cylinder groups and each throttle controls the air flow through manifolding to all the cylinders of its respective group.

Furthermore, the turbocharger form of supercharger illustrated in FIG. 2 may be replaced if desired by any other suitable form of boost device, such as an electrically driven air pump or compressor or a mechanically driven positive displacement air pump, as examples. Additional known forms of supercharging devices may equally well be substituted as they may be suited to a particular engine application. It is intended, however, that the supercharger or boost device applied should be used only when higher torque is needed during DOD operation with cylinders deactivated. Thus, the time in the DOD cylinder mode may be extended and the efficiencies of operation of this mode may be realized over a larger portion of the engine operating period.

Figure 3:
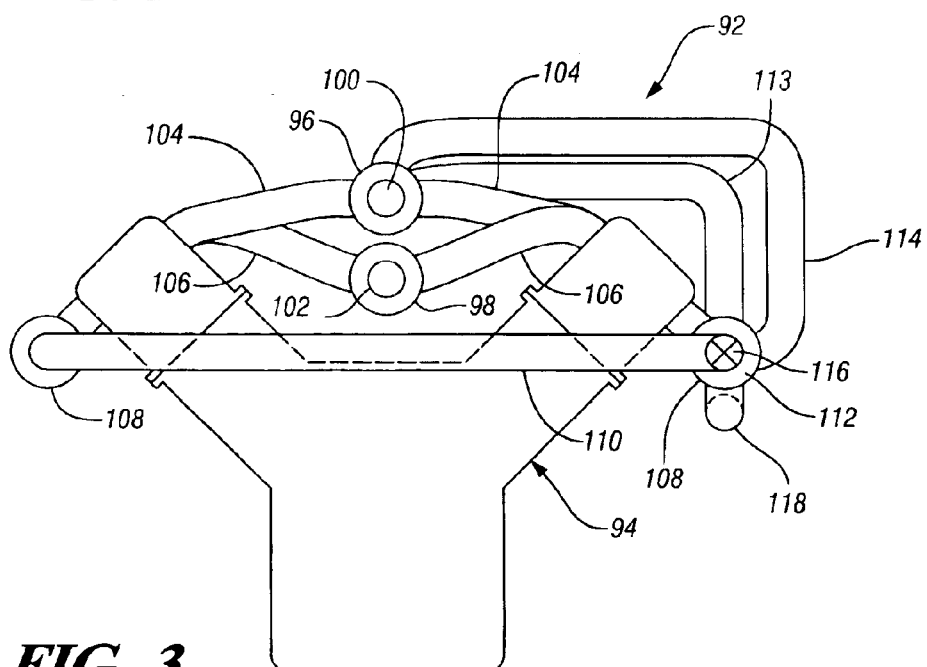
FIG. 3 is an end view of an alternative embodiment of V-type engine having separate intake manifolds and a turbocharger boost system according to the invention.

Referring now to FIG. 3 of the drawings, an alternative embodiment of V engine arrangement is illustrated, generally indicated by numeral 92. Engine 92 includes the usual cylinder block, heads and other equipment of the main engine body 94 but is equipped with dual air intake manifolds 96, 98 positioned one above the other and each having an inlet throttle 100, 102 respectively.

Intake manifold 96 has intake runners 104 connecting with a first group of cylinders, not shown, which are STD cylinders not capable of being deactivated. Intake manifold 98 has intake runners 106 which connect with a second cylinder group of DOD deactivation cylinders, not shown.

Engine 92 also includes exhaust manifolds 108 connected by a crossover pipe 110 to feed a turbocharger 112 driven by exhaust gas. The turbocharger 112 draws in air through an intake tube 113 and delivers pressurized air through a conduit 114 to the intake manifold 96 for delivery to the STD cylinders when needed in the deactivation mode. In operation, a shutoff valve 116 in an exhaust outlet pipe 118 redirects exhaust gas from the exhaust outlet pipe for driving the turbocharger.

In a standard operating mode, the valve 116 is open, deactivating the turbocharger, and the throttles 100, 102 are operated together to provide equal amounts of air to each of the engine cylinders, all of which are supplying power. When switching to cylinder deactivation, the throttles are moved in opposite directions concurrently and progressively until the DOD throttle 102 is completely closed and the STD throttle 100 is opened further in order to smoothly transfer power from all eight cylinders to the four cylinders continuing to operate in the DOD mode. In this regard, operation of the throttles is similar to that described relative to the engine of FIGS. 1 and 2, except that only one throttle is utilized for each cylinder group.

In like manner, operation of the engine turbocharger is reserved for the deactivation mode under conditions when additional torque is needed. This is supplied by slightly boosting the cylinder air charge in manifold 96 connected with the first group of cylinders, which remain operational during deactivation of the second group of cylinders.

Figure 4:
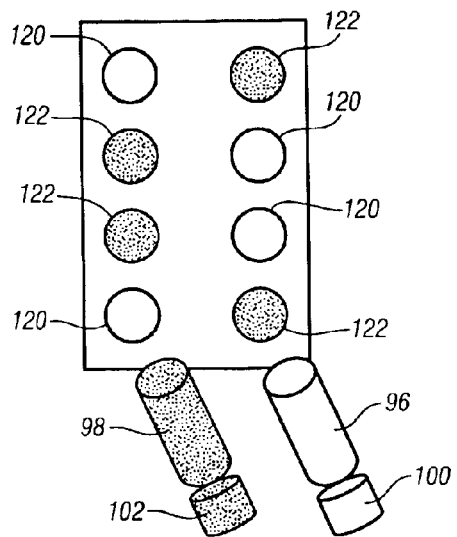
FIGS. 4–6 are schematic views of alternative cylinder arrangements showing various cylinder groups which may be selected for each arrangement.
Figure 5:
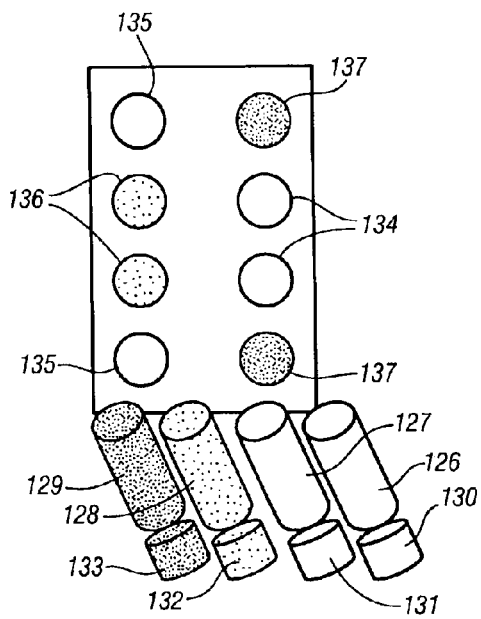
Figure 6:
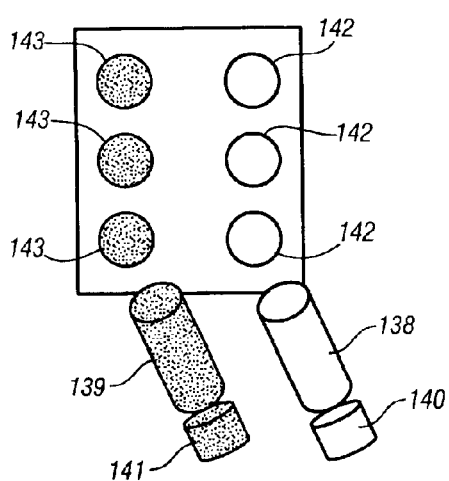

Referring now to FIGS. 4–6, there are shown three examples of engine cylinder arrangements for deactivation. The embodiment of engine 92 is schematically illustrated in FIG. 4 wherein two manifolds 96, 98 controlled by two throttles 100, 102 are connected to respectively control a first group of cylinders 120 and a second group of DOD cylinders 122 provided in a V8 engine.

FIG. 5 schematically illustrates an alternative V8 engine arrangement wherein four separate manifolds 126–129 are controlled respectively by throttles 130–133 and feed air to four separate cylinder groups 134, 135, 136, 137. In this arrangement, STD cylinder groups 134 and 135 remain operational under all engine conditions and are controlled by their separate throttles to provide equal amounts of power.

DOD cylinders 136 are controlled by throttle 132 and DOD cylinders 137 are controlled by throttle 133 to provide for two modes of cylinder deactivation. The cylinders of group 137 may first be deactivated in order to provide operation of the engine on six cylinders, including the cylinders of group 136. Then, if further cylinder deactivation is desired, the cylinders of group 136 are also deactivated, leaving only the cylinders of groups 134 and 135 operational. Thus, the engine in FIG. 5 is capable of two separate deactivation steps in addition to the normal full operational mode.

FIG. 6 illustrates a V6 engine arrangement wherein manifolds 138 and 139 are controlled respectively by throttles 140 and 141. Manifold 138 connects with a first group of three STD cylinders 142 located in one bank of the V6 engine while manifold 139 connects with a second group of three DOD cylinders 143 located in an opposite bank of the engine.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An engine equipped for deactivation and reactivation of a select number of cylinders by selectively deactivating opening of intake and exhaust valves of cylinder groups intended to be deactivated, the engine comprising:

separate air intake throttles including at least one throttle for each cylinder group to be selectively deactivated and at least throttle one for each cylinder group intended to remain activated; and a control for selectively actuating the throttles of the various cylinder groups, the control being operative during cylinder deactivation to actuate the throttles, prior to deactivation of the valves of a cylinder group to be deactivated, to smoothly transfer engine torque load from the cylinder group to be deactivated to a cylinder group to remain activated by concurrently and progressively closing the at least one throttle of a group of cylinders to be deactivated and further opening the at least one throttle of a group of cylinders to remain activated.

2. An engine as in claim 1 wherein the control is operative during cylinder reactivation to actuate the throttles of the various cylinder groups, after reactivation of the valves of the previously deactivated group of cylinders, to smoothly transfer a desired portion of the torque load from the group of cylinders that remained activated to the previously deactivated group of cylinders.

3. An engine as in claim 2 wherein the control is operative during cylinder reactivation to transfer the torque load by concurrently and progressively opening the at least one throttle of a group of cylinders to be reactivated and partially closing the at least one throttle of a group of cylinders to remain activated.

4. An engine as in claim 1 including a supercharger connected with cylinders to remain activated, the supercharger being selectively operable during deactivation of the other cylinders to boost the torque of the activated cylinders when needed to provide increased engine torque without reactivation of the deactivated cylinders.

5. An engine as in claim 4 wherein the supercharger is a turbocharger driven by engine exhaust gas.

6. An engine as in claim 4 wherein the supercharger is electrically driven.

7. A method of operating an engine equipped for deactivation of intake and exhaust valves of at least one group of cylinders with operation of the engine by an other group of activated cylinders, the method comprising:

prior to valve deactivation, smoothly transferring the engine torque load of the one group to the other group of cylinders by concurrently and progressively closing a throttle of the one group of cylinders to be deactivated and further opening a throttle of the other group of cylinders to remain activated.

8. A method as in claim 7 including, after valve reactivation, smoothly transferring a suitable portion of the engine torque load from the other group to the one group of cylinders by concurrently and progressively opening a throttle of the one group of cylinders to be reactivated and partially closing a throttle of the other group of cylinders to remain activated.

9. A method as in claim 8 including selectively increasing the torque range of the engine, during operation with the one group of cylinders deactivated, by boosting the cylinder air charge pressure of the other group of cylinders remaining activated, the pressure boost being controlled to provide extended operation during cylinder deactivation over a limited range of increased torque without requiring reactivation of the one group of deactivated cylinders.

* * * * *